(12) United States Patent
Precoda et al.

(10) Patent No.: US 8,527,270 B2
(45) Date of Patent: Sep. 3, 2013

(54) METHOD AND APPARATUS FOR CONDUCTING AN INTERACTIVE DIALOGUE

(75) Inventors: Kristin Precoda, Mountain View, CA (US); Horacio Franco, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 170 days.

(21) Appl. No.: 12/847,814

(22) Filed: Jul. 30, 2010

(65) Prior Publication Data

US 2012/0029903 A1    Feb. 2, 2012

(51) Int. Cl.
*G10L 15/00* (2013.01)
*G06F 17/30* (2006.01)

(52) U.S. Cl.
USPC .......................... 704/240; 704/244; 704/251

(58) Field of Classification Search
USPC ................. 704/234, 240, 243, 244, 251, 255, 704/2, 3, 4, 5, 7, 8, 10, 277; 707/725, 751
See application file for complete search history.

(56) References Cited

U.S. PATENT DOCUMENTS

| | | | |
|---|---|---|---|
| 5,819,220 A * | 10/1998 | Sarukkai et al. ........... 704/270.1 |
| 5,983,177 A | 11/1999 | Wu et al. |
| 6,092,044 A | 7/2000 | Baker et al. |
| 6,192,332 B1 * | 2/2001 | Golding ........................... 704/2 |
| 6,243,680 B1 | 6/2001 | Gupta et al. |
| 6,345,245 B1 | 2/2002 | Sugiyama et al. |
| 6,356,865 B1 * | 3/2002 | Franz et al. ........................ 704/2 |
| 6,374,210 B1 | 4/2002 | Chu |
| 6,418,431 B1 * | 7/2002 | Mahajan et al. ............... 704/257 |
| 6,615,178 B1 * | 9/2003 | Tajima ........................... 704/277 |
| 6,801,893 B1 | 10/2004 | Backfried et al. |
| 6,952,665 B1 * | 10/2005 | Shimomura et al. .............. 704/2 |
| 7,243,069 B2 * | 7/2007 | Jaepel et al. ................... 704/235 |
| 7,308,404 B2 | 12/2007 | Venkataraman et al. |
| 7,337,116 B2 | 2/2008 | Charlesworth et al. |
| 7,590,533 B2 | 9/2009 | Hwang |
| 7,716,037 B2 * | 5/2010 | Precoda et al. .................... 704/2 |
| 7,752,051 B2 * | 7/2010 | Mizutani et al. .............. 704/275 |
| 7,756,710 B2 * | 7/2010 | Franco et al. ................. 704/255 |
| 8,078,467 B2 * | 12/2011 | Wu et al. ....................... 704/270 |
| 8,090,570 B2 * | 1/2012 | Waibel et al. ..................... 704/2 |
| 2003/0191626 A1 * | 10/2003 | Al-Onaizan et al. .............. 704/8 |
| 2004/0006465 A1 * | 1/2004 | Phillips et al. ................. 704/240 |
| 2005/0102141 A1 * | 5/2005 | Chikuri ......................... 704/244 |
| 2005/0261910 A1 * | 11/2005 | Precoda et al. ............... 704/277 |
| 2006/0015317 A1 | 1/2006 | Nakagawa |

(Continued)

OTHER PUBLICATIONS

Daciuk et al. "Incremental Construction of Minimal Acyclic Finite-State Automata," Computational Linguistics, vol. 26, No. 1, Mar. 2000, pp. 3-16.

*Primary Examiner* — Martin Lerner

(57) ABSTRACT

The present invention relates to a method and apparatus for enhancing interactive translation and dialogue systems. In one embodiment, a method for conducting an interactive dialogue includes receiving an input signal in a first language, where the input signal includes one or more words, processing the words in accordance with a vocabulary, and adjusting a probability relating to at least one of the words in the vocabulary for an output signal. Subsequently, the method may output a translation of the input signal in a second language, in accordance with the vocabulary. In one embodiment, adjusting the probability involves adjusting a probability that the word will be used in actual conversation.

17 Claims, 4 Drawing Sheets

(56) References Cited

U.S. PATENT DOCUMENTS

| | | |
|---|---|---|
| 2006/0015318 A1* | 1/2006 | Moore .............................. 704/2 |
| 2006/0031061 A1* | 2/2006 | Xun ................................. 704/4 |
| 2006/0100876 A1* | 5/2006 | Nishizaki et al. ............. 704/257 |
| 2007/0083374 A1* | 4/2007 | Bates et al. ................... 704/257 |
| 2007/0118353 A1 | 5/2007 | Cho et al. |
| 2008/0097742 A1* | 4/2008 | Ushioda ............................ 704/3 |
| 2008/0114583 A1* | 5/2008 | Al-Onaizan et al. ............. 704/2 |
| 2008/0162117 A1* | 7/2008 | Bangalore et al. ............. 704/10 |
| 2009/0281789 A1 | 11/2009 | Waibel et al. |
| 2009/0313017 A1* | 12/2009 | Nakazawa et al. ........... 704/244 |
| 2011/0040559 A1 | 2/2011 | Kim et al. |
| 2011/0125499 A1 | 5/2011 | Griggs et al. |
| 2011/0213613 A1* | 9/2011 | Cohen et al. .................. 704/235 |
| 2012/0029904 A1* | 2/2012 | Precoda et al. .................. 704/2 |

* cited by examiner

US 8,527,270 B2

METHOD AND APPARATUS FOR CONDUCTING AN INTERACTIVE DIALOGUE

REFERENCE TO GOVERNMENT FUNDING

This application was made with Government support under contract no. HR0011-06-C-0023 awarded by the Defense Advanced Research Projects Agency. The Government has certain rights in this invention.

FIELD OF THE INVENTION

The present invention relates generally to language processing, and relates more particularly to translation and dialogue systems.

BACKGROUND OF THE DISCLOSURE

Interactive translation and dialogue systems are computer systems that converse with human users or enable conversations between human users. Such systems may be monolingual in that a "conversation" occurs between the system and a human user (e.g., a telephone-based dialogue system that provides airline flight information responsive to user commands). Such systems may also be bilingual in that the "conversation" occurs between two human users who speak different languages (in this case, the dialogue system also performs translation between languages). Although the accuracy of interactive translation and dialogue systems is improving, they may still suffer from errors and inaccuracies.

For example, both monolingual and bilingual systems may have trouble understanding a user input. One common instance of this is when a user wants to use a word that is currently unknown to the system (e.g., the user uses the term "Madras" for a location that the system knows as "Chennai"). Another common and unexpected behavior is the inability of the system to recognize a word in a user input that was included in a previous system output. For example, a first speaker using a bilingual system may say something in Spanish that gets translated into English as "the water is murky." A second speaker may then say in English, "how long has it been murky?" However, the system may recognize the word "murky" in the second speaker's input as "marquis," "thirty," or some other incorrect word, despite having just output the word "murky" in accordance with the translation of the first speaker's input.

SUMMARY OF THE INVENTION

The present invention relates to a method and apparatus for enhancing interactive translation and dialogue systems. In one embodiment, a method for conducting an interactive dialogue includes receiving an input signal in a first language, where the input signal includes one or more words, processing the words in accordance with a vocabulary, and adjusting a probability relating to at least one of the words in the vocabulary for an output signal. Subsequently, the method may output a translation of the input signal in a second language, in accordance with the vocabulary. In one embodiment, adjusting the probability involves adjusting a probability that the word will be used in actual conversation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for enhancing interactive translation and dialogue systems. Some embodiments of the invention leverage the concept of "lexical entrainment," i.e., the phenomenon in which people use words recently used in conversation (whether with another person or with a dialogue system). In other words, the present invention is sensitive to the context provided by words previously output by or input to the system. In one embodiment, this sensitivity is enforced by increasing, in the language model used by the recognition processor, the probabilities of words that were previously output by the system, to reflect the increased probabilities of those words in actual conversational behavior.

Figure 1A:
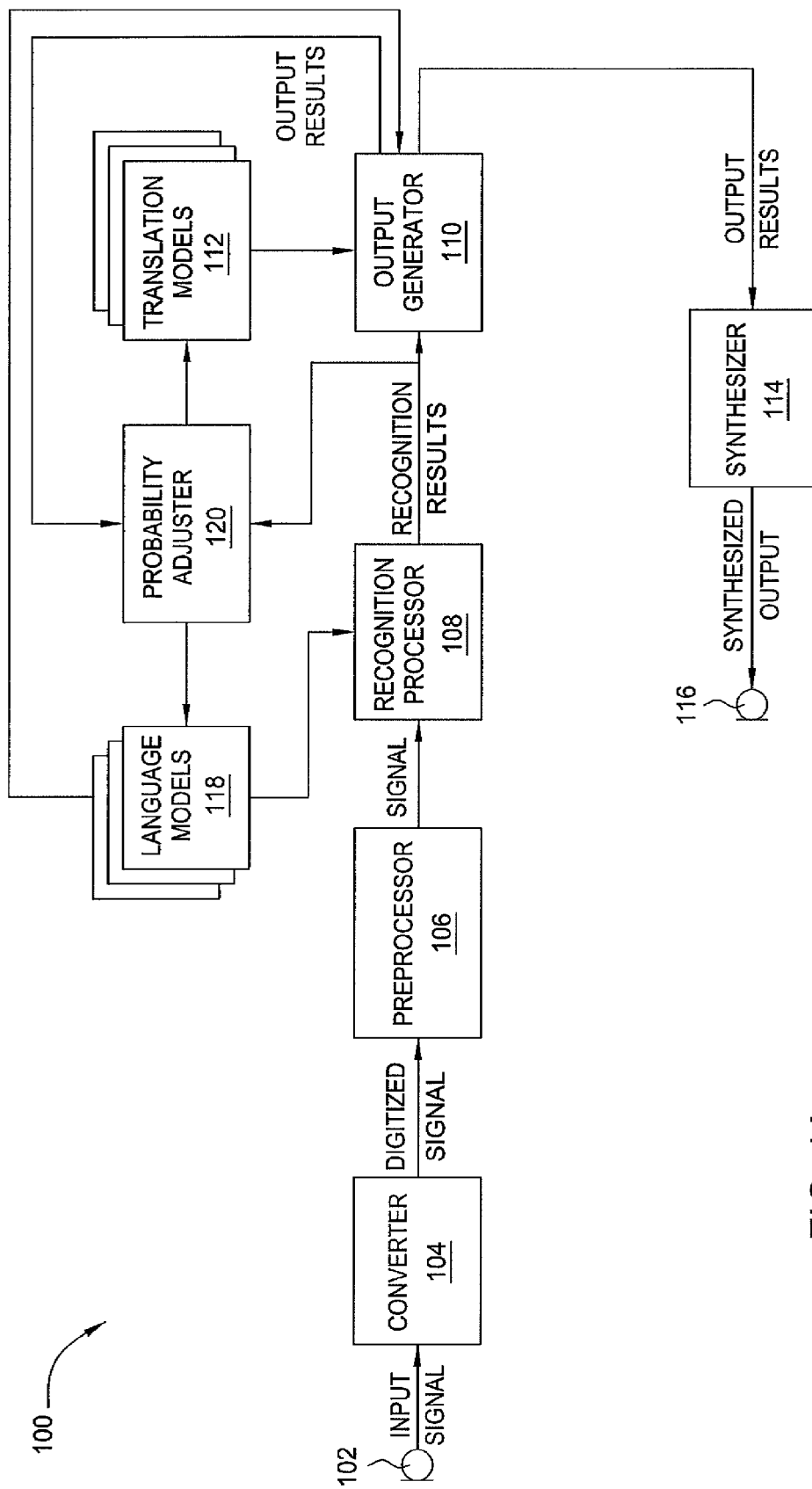
FIG. 1A is a schematic diagram illustrating one embodiment of an interactive translation and dialogue system that is bilingual, according to the present invention.
Figure 1B:
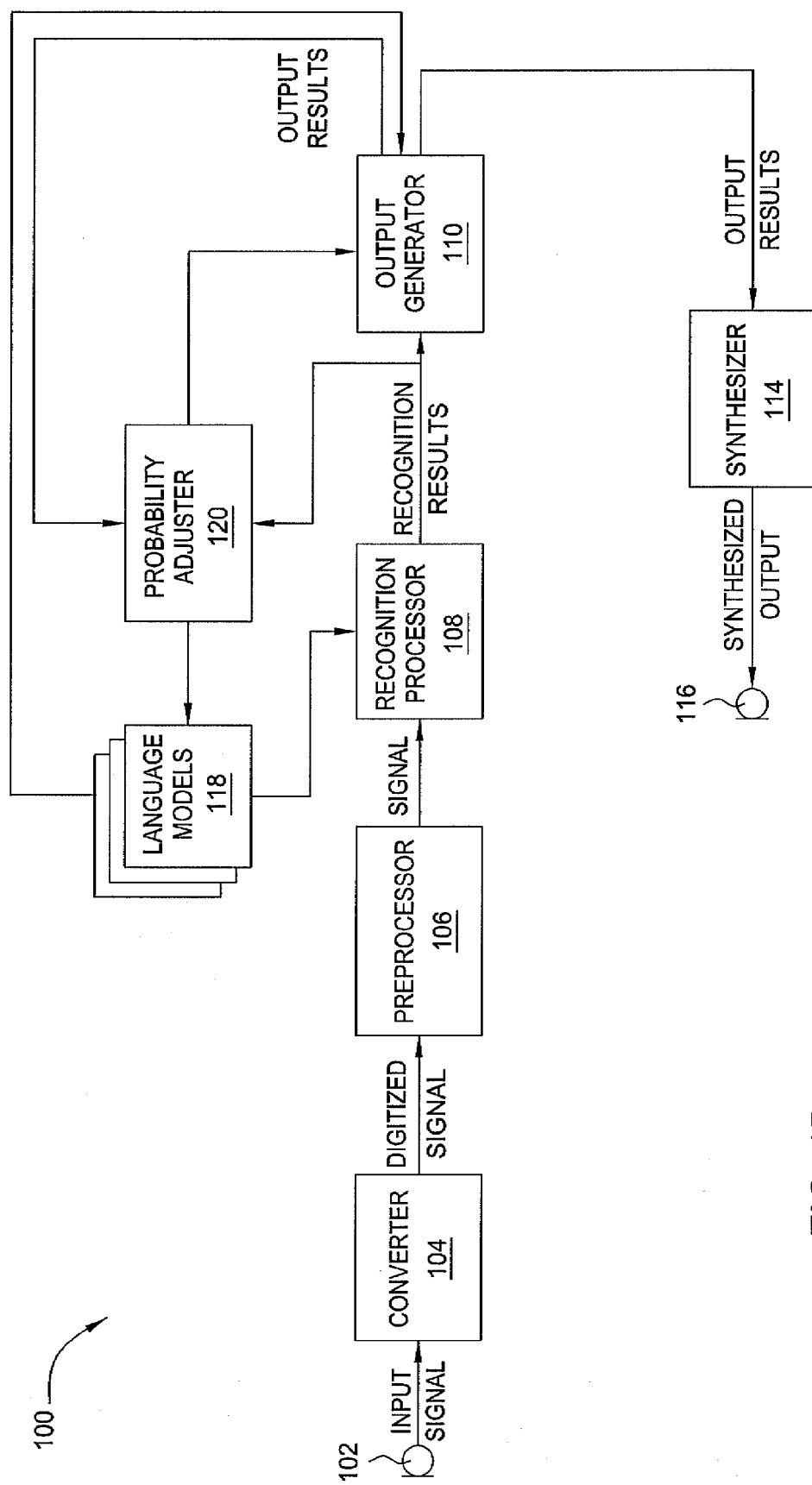
FIG. 1B is a schematic diagram illustrating an alternative embodiment of the interactive translation and dialogue system of FIG. 1A, in which the system is monolingual, according to the present invention.

FIG. 1A is a schematic diagram illustrating one embodiment of an interactive translation and dialogue system 100 that is bilingual, according to the present invention. FIG. 1B is a schematic diagram illustrating an alternative embodiment of the interactive translation and dialogue system of FIG. 1A, in which the system is monolingual, according to the present invention. As illustrated, the bilingual embodiment of the system 100 includes at least one additional component (i.e., a set of translation models 112), described in further detail below. The system 100 may comprise a stand-alone device, or may be integrated as part of a larger speech-based system.

The system 100 comprises an input device 102 that receives a signal input to the system 100. The input device may be a microphone, transducer, or other device in the case of an audio signal, or may be a keyboard, stylus, writing tablet, scanner, or other device in the case of a textual signal. The input device 102 is optionally coupled to an analog-to-digital converter 104 that processes the input signal to produce a digitized signal.

The optional analog-to-digital converter 104 is in turn coupled to an optional preprocessor 106 that preprocesses the digitized signal to facilitate subsequent recognition processing. In one embodiment, where the input signal is an audio signal, the optional preprocessor 106 is configured to perform at least one of the following on the digitized signal: noise reduction (e.g., reduce background noise), endpointing (i.e., identify start and/or endpoints of the digitized signal), channel normalization (e.g., reduce the effects of different channels and microphones), vocal tract length normalization (e.g., reduce the variability of acoustic features due to different vocal tract lengths), or other kinds of preprocessing. In another embodiment, where the input signal is a textual signal, the optional preprocessor 106 is configured to perform at least one of the following on the digitized signal: skew compensation (e.g., reduce skew of the text), binarization (i.e., separate foreground components from background components), or other kinds of pre-processing.

The preprocessor 106 is coupled to a recognition processor 108. The recognition processor 108 is configured to recognize words and phrases (or portions of words and phrases) in the digitized signal. In one embodiment, where the input signal is an audio signal, the recognition processor 108 is a speech recognition processor, such as an automatic speech recognition (ASR) processor. Given an audio signal containing speech, ASR techniques produce recognition results comprising a textual sequence of words comprising, but not necessarily limited to, a potentially imperfect transcription of the audio signal. In another embodiment, where the input signal comprises, for example, a scanned image containing text or a handwritten input, the recognition processor 108 is a character recognition processor, such as an optical character recognition (OCR) processor. Given such a signal, OCR techniques produce recognition results comprising a sequence of symbols (e.g., words or characters) comprising a potentially imperfect transcription of the text in the signal. In embodiments where the input signal is a textual signal, no recognition processing may be necessary.

The recognition processor 108 outputs the recognition results to an output generator 110. The output generator 110 generates raw output responsive to the recognition results. For example, in the case of a monolingual dialogue system (e.g., FIG. 1B), the output generator 110 may generate raw data responsive to a user's question (e.g., the arrival time of a given airline flight). In the case of a bilingual dialogue system (e.g., FIG. 1A), the output generator 110 may comprise a translator that translates the recognition results from a first language (i.e., the language of the input signal) into translation results in a second language. The output generator 110 is coupled to one or more translation models 112 (in the bilingual embodiment) or optional language models 118 (in either the monolingual or bilingual embodiment) that assist in generating the output. The translation models 112 and language models 118 form at least one vocabulary for the system 100. In one embodiment, multiple vocabularies may be available to the recognition processor 108. For example, the recognition processor 108 might employ different input and output vocabularies, where the input vocabulary is in a first language and the output vocabulary is in a second language.

The output generator 110 then outputs the raw output to an optional synthesizer 114 that generates an output signal representing the content of the raw output. For example, in the monolingual dialogue system discussed above, the output generator 110 may output raw data regarding flight arrival time that is synthesized into the format of a response to the user (e.g., "Flight No. 28 is scheduled to land at 3:00 PM"). In the bilingual dialogue system discussed above, the output generator 110 may output translation results that are synthesized into an output signal representing the content of the input signal in the second language. In one embodiment, where the output signal of the output device 116 is intended to be an audio signal, the optional synthesizer 114 is a speech synthesizer that synthesizes the translation results into an audio signal that represents the content of the input speech signal in the second language. In another embodiment, where the output signal of the output device 116 is intended to be a textual signal, the translation may not need to be synthesized and can be output directly from the output generator 110. Alternatively, the optional synthesizer 114 may format the output signal. For example, the synthesizer may format raw data into a natural language response. In one embodiment, the output generator 110 and the optional synthesizer 114 are combined in a single component.

The synthesized output is then fed to an output device 116. In one embodiment, where the output signal is an audio signal, the output device 116 is a speaker. In another embodiment, where the output signal is a textual signal, the output device 116 is a display.

In one embodiment of the present invention, the recognition processor 108 is further coupled to a probability adjuster 120. In a further embodiment, the output generator is also coupled to the probability adjuster 120. The probability adjuster 120 receives the recognition results from the recognition processor 108 and/or the output results from the output generator 110 and uses the recognition results and/or output results to adjust the probabilities associated with words in one or more language models 118 that are used by the recognition processor 108 and the output generator 110. The language models 118 may comprise multiple sets of language models for different languages (e.g., a first set of English language models, a second set of Spanish language models, etc.). As described in further detail below, this adjustment includes, in one embodiment, increasing the probability of one or more words in the language models 118, based on their occurrence in the recognition results or output results. In another embodiment, the probability of a word occurring in the recognition results or output results is increased such that the word is preferred over its synonyms. This will allow the system 100 to adapt its output to the user's preferences (e.g., if the user consistently refers to "Chennai" as "Madras," the system 100 will adapt to the user's preferences and also refer to "Madras").

The adjusted probability distributions are provided to the language models 118, which are in turn accessed by the recognition processor 108 when performing recognition processing, as discussed above. The adjusted probability distributions are also provided to the translation models 112 and the output generator 110 (via the translation models 112).

As discussed above, the system 100 may be configured as a stand-alone device, or may be integrated as part of a larger language-based system. In addition, the system 100 may be configured as a distributed system wherein one or more of the components discussed above comprises or is integrated as part of a separate device. For example, the recognition processor 108 may remotely access the language models 118 over a network. This allows for easy upgrade of the language models 118 and reduces the processing and memory requirements for the system 100. Alternatively, the input device 102 and/or the output device 116 may be remotely coupled to the system 100. This allows individuals in different locations to converse with each other remotely in different languages.

Figure 2:
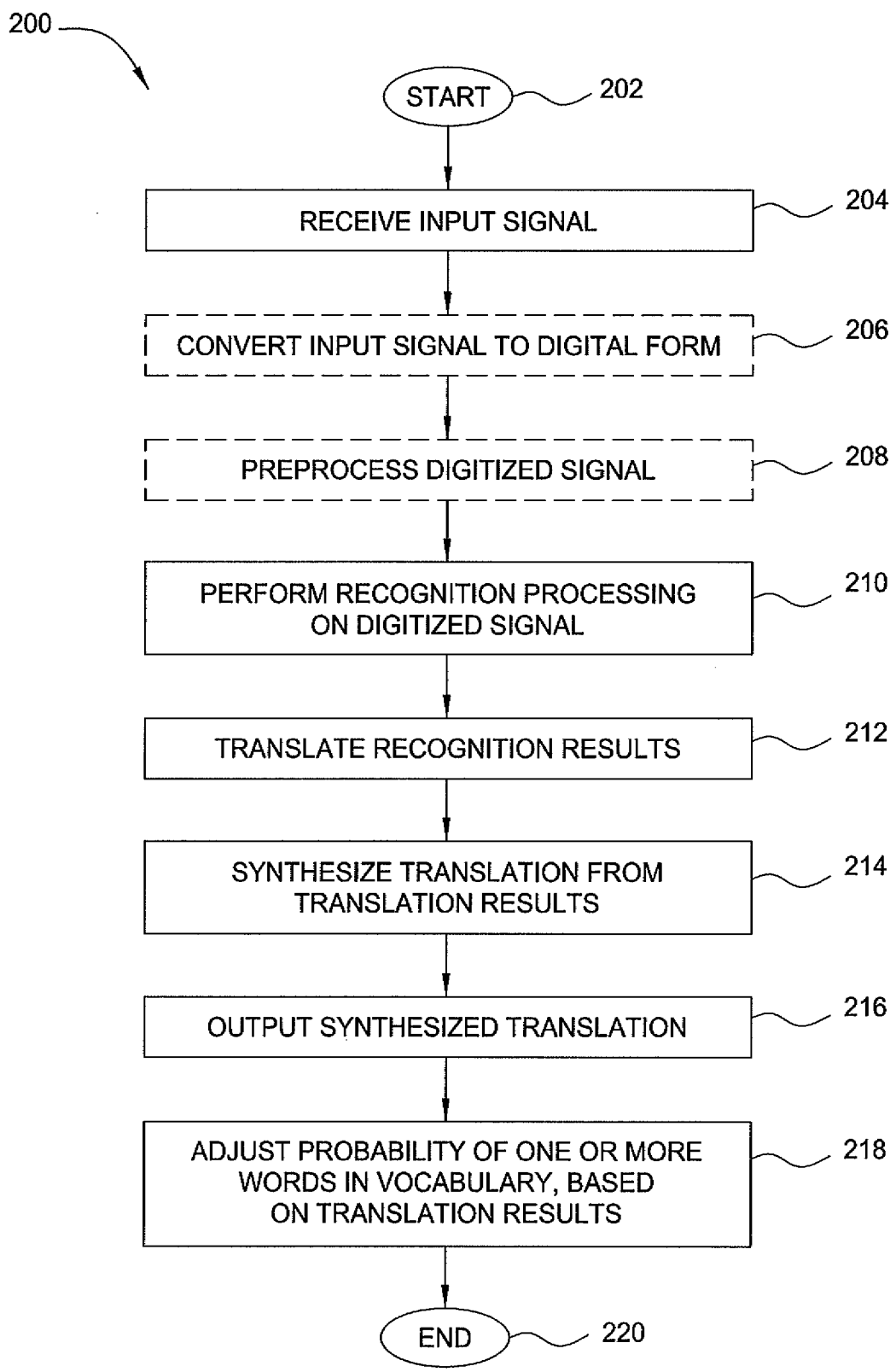
FIG. 2 is a flow diagram illustrating one embodiment of a method for performing language translation, according to the present invention.

FIG. 2 is a flow diagram illustrating one embodiment of a method 200 for performing language translation, according to the present invention. As such, the method 200 may be implemented by a system such as the system 100 illustrated in FIG. 1 to enhance the quality of language translations. In such an instance, the output generator 110 is configured as a language translator.

The method 200 is initialized in step 202 and proceeds to step 204, where the method 200 receives an input signal. The input signal may be an audio signal (e.g., containing an utterance from a speaker) or a textual signal (e.g., containing a scanned, typed, or handwritten statement from a writer) in a first language. In optional step 206 (illustrated in phantom), the method 200 converts the input signal to digital form (e.g., if the input signal was received as an analog signal).

In optional step 208 (illustrated in phantom), the method 200 preprocesses the digitized signal to facilitate subsequent recognition processing. In one embodiment, where the input signal is an audio signal, preprocessing includes at least one of the following techniques: noise reduction (e.g., reduce background noise in the digitized signal), endpointing (i.e., identify start and/or endpoints of the digitized signal), channel normalization (e.g., reduce the effects of different channels and microphones), vocal tract length normalization (e.g., reduce the variability of acoustic features due to different vocal tract lengths), or other kinds of preprocessing. In another embodiment, where the input signal is a textual signal, preprocessing includes at least one of the following techniques: skew compensation (e.g., reduce skew of the text), binarization (i.e., separate foreground components from background components), or other kinds of pre-processing.

In step 210, the method 200 performs recognition processing on the digitized signal in order to recognize words contained therein. In the case of an audio input signal, these words may be recognized using any one or more of a number of speech processing techniques that may access one or more language models. In one embodiment, speech recognition processing is performed using one or more ASR techniques that generate recognition results comprising recognized words (e.g., a machine-generated transcription of the digitized signal). In the case of a textual input signal, these words may be recognized using any one or more of a number of character processing techniques that access one or more language models or word lists. For example, in one embodiment, character recognition processing is performed using one or more OCR techniques that generate recognition results comprising recognized words (e.g., a machine-generated transcription of the digitized signal).

In step 212, the method 200 translates the recognition results into a second language, different from the first language. This produces translation results that represent the content of the input signal in the second language. In one embodiment, the method 200 accesses one or more translation models (e.g., translation models or language models that aid in translating from a first language to a second language) in performing the translation.

In step 214, the method 200 synthesizes a translation based on the translation results. The synthesized translation comprises an audio or textual output signal. In the case of an audio output signal, the method 200 synthesizes an audio signal that presents the translation results in audio form. In one embodiment, the audio translation is synthesized in accordance with one or more speech synthesis techniques. In the case of a textual output signal, the method 200 may simply output a textual signal that presents the translation results in text form (i.e., no actual synthesis may be necessary). The method 200 then outputs the synthesized translation in step 216.

In step 218, the method 200 adjusts the probability of one or more words in a vocabulary of the interactive dialogue system 100 (e.g., in the language models), but for the second language. In one embodiment, this adjustment involves increasing the probability of one or more words in the vocabulary that have occurred in outputs generated by the system 100 (e.g., translation results). In another embodiment, this adjustment involves decreasing the probabilities of one or more other words in the vocabulary that did not occur in previous outputs. Although step 218 is illustrated in FIG. 2 as occurring directly after step 216, step 218 may actually occur at any time after step 212 (i.e., the probability may be adjusted at any time after the recognition results are translated). Thus, step 218 may occur before, after, or in parallel with steps 214-216.

In one embodiment, the probabilities of these words are increased by increasing the unigram probabilities for these words and then re-normalizing the unigram probabilities to sum to one. In another embodiment, the probabilities of these words are increased by increasing the probabilities of all n-grams containing these words and then re-normalizing the whole language model. In yet another embodiment, the probabilities of these words are increased by increasing the probabilities of all n-grams containing these words in a count-based language model and then deriving probabilities for the whole language model from the counts.

The method 200 may use any one or more of a number of techniques for selecting which words should have their probabilities adjusted in the vocabulary. For instance, in one embodiment, the method 200 increases the probabilities of only certain classes of words. In this case, there may be a list of words whose probabilities should not be adjusted, such as "the," "and," "of," or "is." In another embodiment, the method 200 does not increase the probabilities of words that already have high probabilities (which may, in some embodiments, include "the," "and," "of," or "is," for example).

In one embodiment, the probabilities of the words are adjusted for a threshold period of time or number of input signals only. For instance, in one embodiment, the probabilities are adjusted only for processing of the next input signal (and are then returned to their pre-adjustment values). In another embodiment, the adjusted probabilities decay over a predefined period of time or number of input signals to their pre-adjustment values. This recognizes the fact that lexical entrainment with respect to a particular word may not persist for all subsequent inputs.

The method 200 terminates in step 220.

The method 200 therefore leverages the concept of lexical entrainment in order to improve the performance of a bilingual dialogue system, such as a language translation system. However, the concepts of the present invention may be extended to improve monolingual interactive dialogue systems as well. For instance, users may be frustrated by interactive dialogue systems that "insist" on using a particular word for a concept, while the user prefers another word. As an example, suppose a user interacting with an automated airline information system asks for the status of a flight "between Frankfurt and Madras." If the system continually refers to "Madras" as "Chennai," however, the user may become frustrated or confused. Enabling the automated system to adapt to the user's utterances can improve the user experience by making it more personal and pleasant. In such an instance, the automated system has prior knowledge of the fact that "Madras" and "Chennai" refer to the same city and changes its output to say "Madras" instead of "Chennai." This will make for a better user experience, since the automated system will be using the user's preferred terminology.

This application includes some modification to the method 200. For instance, steps analogous to steps 212-216 are taken (e.g., synthesizing, generating, and outputting an output), but without the translation. Adjustment of the probability in accordance with step 218 then includes adjusting the probability of the user's preferred word (e.g., "Madras" in the example) so that it is higher than any of the word's synonyms (e.g., "Chennai" in the example).

Moreover, although the system 100 and method 200 are described within the context of a probabilistic system (e.g., a system that outputs recognition results in accordance with word probabilities), those skilled in the art will appreciate that the concepts of the present invention can be applied to non-probabilistic systems as well. For instance, a rule-based grammar can be constructed dynamically to recognize a user's next input, based on knowledge of the previous input or output. This may be helpful, for example, in the case where a written input contains misspellings or ambiguous terms, and the knowledge of the previous input can be used in disambiguation.

Although the present invention is described within the context of speech and text processing, those skilled in the art will appreciate that the concepts of the present invention can be easily extended to other types of inputs and outputs as well. For example, the input and/or output can be in video form. This may be helpful, for example, where at least one of the conversants speaks in a sign language.

Figure 3:
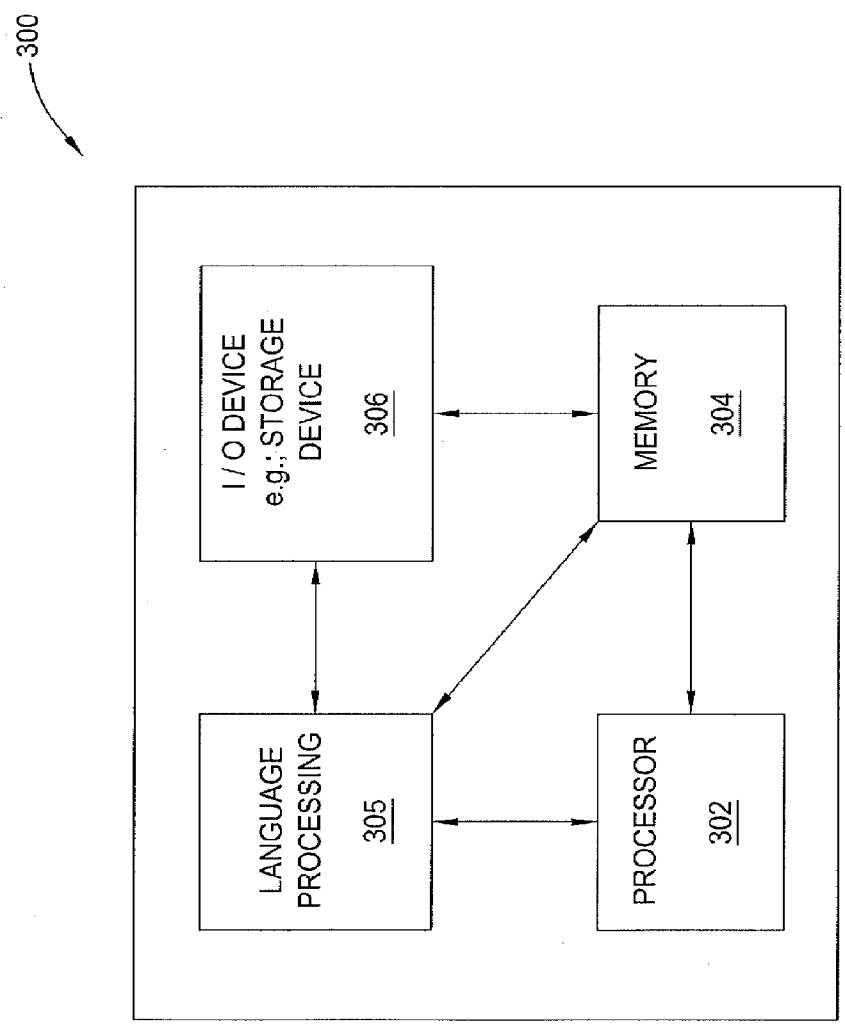
FIG. 3 is a high level block diagram of the present invention implemented using a general purpose computing device.

FIG. 3 is a high level block diagram of the present invention implemented using a general purpose computing device 300. It should be understood that embodiments of the invention can be implemented as a physical device or subsystem that is coupled to a processor through a communication channel. Therefore, in one embodiment, a general purpose computing device 300 comprises a processor 302, a memory 304, a language processing module 305, and various input/output (I/O) devices 306 such as a display, a keyboard, a mouse, a modem, a microphone, speakers, and the like. In one embodiment, at least one I/O device is a storage device (e.g., a disk drive, an optical disk drive, a floppy disk drive).

Alternatively, embodiments of the present invention (e.g., language processing 305) can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the language processing module 305 for conducting an interactive dialogue described herein with reference to the preceding Figures can be stored on a non-transitory computer readable medium (e.g., magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for conducting an interactive dialogue, the method comprising:
   receiving a first audio input signal from a user, the first audio input signal comprising a first set of one or more words;
   processing the first audio input signal so as to recognize the first set of one or more words in accordance with a vocabulary comprising a collection of words and an associated set of probabilities corresponding to the collection of words;
   generating a first output signal responsive to the first audio input signal in accordance with the processing, the first output signal comprising a second set of one or more words, wherein the second set of one or more words includes at least one word that is not included in the first set of one or more words;
   adjusting at least one probability in the associated set of probabilities, the at least one probability corresponding to at least one word that is included in the second set of one or more words but is not included in the first set of one or more words, thereby producing an adjusted set of probabilities based on the first output signal; and
   processing a second audio input signal, received after the first output signal is outputted and comprising a third set of one or more words, so as to recognize the third set of one or more words in accordance with the vocabulary and the adjusted set of probabilities,
   wherein at least one of: the processing of the first audio input signal, the generating, the adjusting, or the processing of the second audio input signal is performed using a processor.

2. The method of claim 1, further comprising:
   outputting the first output signal, wherein the first output signal is at least one of: an audio signal, a video signal, or a textual signal.

3. The method of claim 1, wherein the first output signal further comprises a translation of the first set of one or more words into a different language, and wherein the second audio input signal includes one or more words in the different language.

4. The method of claim 1, wherein the adjusting comprises:
   increasing the at least one probability corresponding to the at least one word that is included in the second set of one or more words but is not included in the first set of one or more words.

5. The method of claim 4, wherein the increasing comprises:
   increasing a unigram probability for each word in the second set of one or more words; and
   renormalizing a set of unigram probabilities comprising a unigram probability for each word in at least one language model to sum to one.

6. The method of claim 5, wherein the increasing comprises:
   searching for one or more terms in an external data source;
   estimating a new language model in accordance with data extracted from the external data source;
   combining the new language model with the at least one language model to produce an adjusted language model.

7. The method of claim 4, wherein the increasing comprises:
   increasing a probability of at least one n-gram in at least one language model that includes at least one word in the second set of one or more words; and
   renormalizing the at least one language model.

8. The method of claim 4, wherein the increasing increases the at least one probability by a threshold amount.

9. The method of claim 4, wherein the increasing increases the at least one probability for a threshold period of time.

10. The method of claim 9, wherein the threshold period of time is a threshold number of input signals received subsequent to the first output signal.

11. The method of claim 4, wherein the increasing increases the at least one probability by an amount that decays over time.

12. The method of claim 1, wherein the adjusting comprises:

decreasing the at least one probability corresponding to at least one word in the vocabulary, where the at least one word is not contained in the second set of one or more words.

13. The method of claim 12, wherein the decreasing decreases the at least one probability by a threshold amount.

14. A non-transitory computer readable medium containing an executable program for conducting an interactive dialogue, where the program performs steps of:

receiving a first audio input signal from a user, the first audio input signal comprising a first set of one or more words;

processing the first audio input signal so as to recognize the first set of one or more words in accordance with a vocabulary comprising a collection of words and an associated set of probabilities corresponding to the collection of words;

generating a first output signal responsive to the first audio input signal in accordance with the processing, the first output signal comprising a second set of one or more words, wherein the second set of one or more words includes at least one word that is not included in the first set of one or more words;

adjusting at least one probability in the associated set of probabilities, the at least one probability corresponding to at least one word that is included in the second set of one or more words but is not included in the first set of one or more words, thereby producing an adjusted set of probabilities based on the first output signal; and processing a second audio input signal, received after the first output signal is outputted and comprising a third set of one or more words, so as to recognize the third set of one or more words in accordance with the vocabulary and the adjusted set of probabilities.

15. The non-transitory computer readable medium of claim 14 wherein the adjusting comprises:

increasing the at least one probability corresponding to the at least one word that is included in the second set of one or more words but is not included in the first set of one or more words.

16. The non-transitory computer readable medium of claim 14, wherein the adjusting comprises:

decreasing the at least one probability corresponding to at least one word in the vocabulary, where the at least one word is not contained in the second set of one or more words.

17. An interactive dialogue system, the system comprising:

an input device for receiving a first audio input signal from a user, the first audio input signal comprising a first set of one or more words;

a recognition processor for processing the first audio input signal so as to recognize the first set of one or more words in accordance with a vocabulary comprising a collection of words and an associated set of probabilities corresponding to the collection of words;

an output device for producing a first output signal responsive to the first audio input signal in accordance with the processing, the first output signal comprising a second set of one or more words, wherein the second set of one or more words includes at least one word that is not included in the first set of one or more words; and a probability adjuster for adjusting at least one probability in the associated set of probabilities, the at least one probability corresponding to at least one word that is included in the second set of one or more words but is not included in the first set of one or more words, thereby producing an adjusted set of probabilities based on the first output signal, where the recognition processor is additionally for processing a second audio input signal, received after the first output signal is outputted and comprising a third set of one or more words, so as to recognize the third set of one or more words in accordance with the vocabulary and the adjusted set of probabilities.

* * * * *